United States Patent
Huijsing

(10) Patent No.: US 11,946,646 B2
(45) Date of Patent: Apr. 2, 2024

(54) WATER INJECTION SYSTEM FOR OVENS AND METHOD OF INJECTION

(71) Applicant: B/E AEROSPACE, INC., Winston Salem, NC (US)

(72) Inventor: Hans Huijsing, Ijsselstein (NL)

(73) Assignee: B/E Aerospace, Inc., Winston Salem, NC (US)

( * ) Notice: Subject to any disclaimer, the term of this patent is extended or adjusted under 35 U.S.C. 154(b) by 480 days.

(21) Appl. No.: 17/163,123

(22) Filed: Jan. 29, 2021

(65) Prior Publication Data

US 2022/0243924 A1  Aug. 4, 2022

(51) Int. Cl.
  *F24C 15/00* (2006.01)
  *B64D 11/04* (2006.01)
  *F24C 9/00* (2006.01)

(52) U.S. Cl.
  CPC ............ *F24C 15/003* (2013.01); *B64D 11/04* (2013.01); *F24C 9/00* (2013.01)

(58) Field of Classification Search
  CPC ........ F24C 15/327; F24C 15/003; F24C 9/00; B64D 11/04
  USPC ............................................. 219/401; 126/20
  See application file for complete search history.

(56) References Cited

U.S. PATENT DOCUMENTS

| | | | |
|---|---|---|---|
| 5,184,538 A | 2/1993 | Ledet | |
| 6,107,605 A | 8/2000 | Creamer et al. | |
| 7,829,825 B2 * | 11/2010 | Kuhne | F24C 15/327 99/468 |
| 8,857,324 B2 * | 10/2014 | Hozumi | F24C 15/327 99/474 |
| 2004/0261632 A1 * | 12/2004 | Hansen | F24C 15/327 99/468 |
| 2006/0060576 A1 * | 3/2006 | Haas | A61F 7/007 219/543 |
| 2016/0069572 A1 * | 3/2016 | Franzolin | F24C 15/327 219/401 |

FOREIGN PATENT DOCUMENTS

| | | |
|---|---|---|
| CN | 205711346 U | 11/2016 |
| DE | 20200618 U1 | 7/2002 |
| EP | 2236942 A1 | 10/2010 |
| EP | 3571964 A1 | 11/2019 |
| EP | 3680562 A1 | 7/2020 |
| WO | WO-2011056763 A1 | 5/2011 |
| WO | 2012128585 A2 | 9/2012 |

OTHER PUBLICATIONS

Extended European Search Report for European Patent Application No. EP22153752.5, dated Jun. 21, 2022.

* cited by examiner

*Primary Examiner* — Vivek K Shirsat
(74) *Attorney, Agent, or Firm* — Locke Lord LLP; Joshua L. Jones; Gabriella D'Angelo

(57) ABSTRACT

An oven having water injection system comprising an oven including a compartment enclosed on all sides, a water injector, and a first water valve coupled to the water injector, wherein the water valve includes proportional control.

16 Claims, 1 Drawing Sheet

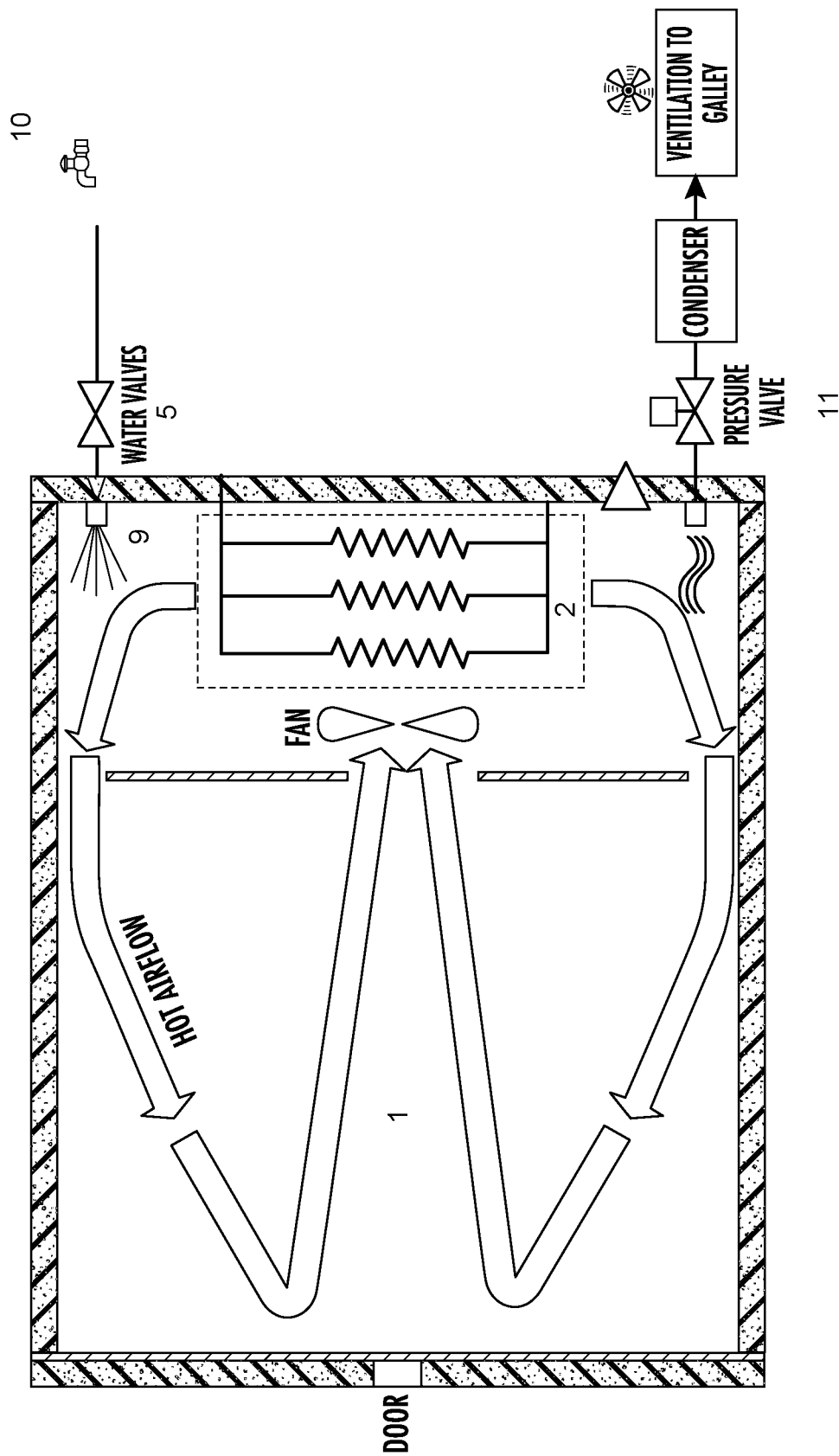

WATER INJECTION SYSTEM FOR OVENS AND METHOD OF INJECTION

BACKGROUND

Technological Field

The present disclosure relates generally to an oven water injection system, and more particularly to a controllable water injection system.

Description of Related Art

Ovens for use in vehicles, such as aircraft, are sometimes operated using water injection systems. These systems spray a water onto a heated surface in order to create steam within the oven and cook the food. Currently on/off solenoid valves are used to control the water spray, and control the water pressure. As a result, peak pressure happens upon water insertion and big pressure drops occur upon pressure release. These drops create issues that require larger pumps to inject a large amount of water quickly, and also create large ups and downs in steam pressure and water presence within the oven cavity. Although, such conventional components and methods of operating ovens have generally been considered satisfactory for their intended purpose, there is still a need in the art for improved water injection system and components having better pressure drop control. The present disclosure provides a solution for this need.

SUMMARY OF THE INVENTION

An oven having water injection system including an oven having a compartment enclosed on all sides, a door on a front side of the compartment, the door operable to open the compartment, a water injector, and a first water valve coupled to the water injector, wherein the water valve includes proportional control. The system can include a proportional-integral-derivative controller (PID) controller, a pulse width modulator controller or an analogue system controller to control the water input.

A second water valve can be coupled to the first water valve. The second water valve can be an on/off valve configured to act as a safety mechanism. An overpressure valve for condensing the steam and returning water to a galley can be placed on the bottom of the cavity. A controller can maintain a predefined pressure by manipulating energy provided to the heating elements. The system can include a heated bottom of the oven in order to maintain the steam pressure and recycle the water that condenses. The oven can be connected to an aircraft galley.

A method of operating an aircraft oven is also disclosed. The method includes providing water to a reservoir disposed outside of a compartment of the oven, partially opening a water valve, injecting water from the reservoir into the compartment through the water valve onto a water heater, and producing steam on the water heater in order to cook a food. The water valve can be opened to a point between fully open and fully closed. The heater is heated by aircraft power. The method can include opening an on/off valve to allow water to reach the water valve. The method can further include collecting condensed water at the bottom of the oven and heating the collected water to a steam temperature. A portion of the condensed water can be returned to the reservoir and can be done so using an on/off valve.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an oven water injection system according to the disclosure.

DETAILED DESCRIPTION

Reference will now be made to the drawings wherein like reference numerals identify similar structural features or aspects of the subject disclosure. For purposes of explanation and illustration, and not limitation, a partial view of an exemplary embodiment of an oven in accordance with the disclosure is shown in FIG. 1 and is designated generally by reference character 1. The oven system described herein provide for better control of water injection within water ovens.

FIG. 1 shows an oven cavity 1 defining a confined space where meals are heated prior to consumption. Water is supplied from outside of the oven cavity 1 and is injected onto a water heater 2 within the oven cavity 1 via the water valves 5 and spray nozzle 9, which turns the water into steam and then heats the food provided therein. Water is connected to a galley faucet 10, allowing it to have a larger supply instead of being attached to a heater reservoir which has to be constantly heated. As heat is transferred to the food from the steam, the steam condenses into water, which is then collected at a bottom of the oven cavity 1, and may be recycled for subsequent use. The bottom of the oven cavity 1 is heated such that the collected water will evaporate again. This feature allows for less water use than conventional ovens.

Water valve 5 is controlled by either a PID controller, a pulse width modulator controller, or an analogue system controller, having a proportional control. Water valve 5 is be equipped with an embedded temperature sensor or pressures valve (not shown) and a controller that maintains a predefined temperature or pressure by manipulating the water provided to the heating elements. When a certain amount of heat or water is required in the oven the controller slowly opens the valve within water injector 9 to spray the water proportionally. This allows a more analog approach of injecting water, instead of opening the pressure valve completely for a certain time, it is only slightly opened. This way less pressure escapes, and a smaller pump is required. Also less water is used since the amount of water released is only as much as necessary for that time, instead of injecting the same amount each time, no matter how much food is getting cooked and to what temperature. The various functions described herein may be controlled by the controller 8, which may be connected to any or all of the controllable and sensing elements described herein, including heater element 2, two supply pumps, cavity drain pumps and valves. PID controllers have a benefit of relatively low noise level, fast warm up time, accurate set point temperature control and fast reaction to disturbances. The key to using a PID function is feedback. Instructions or commands to the controller are used based on individual feedback signals from the motor or sensors being controlled. Their outputs are summed up based on the PID algorithm to drive the motor backwards, forwards, stop, speed up, or slow down. Thus, a valve can be controlled based on an algorithm and controller that reads the air and pressure temperatures within the oven.

The system can also include overpressure valves 11 for condensing the steam and returning to the galley. The overpressure valves 11 can also include a similar arrangement to the injection valves and be controlled by either a PID controller, a pulse width modulator controller, or an analogue system controller, having a proportional control. The algorithm discussed above can also include the temperature of the collected water, the amount of collected water, and a desired temperature of the food. This versatile valve also allows for user controlled input. For instance, the algorithm can include a user input of how many items or which items are getting cooked, and the algorithm will account for how much water needs to be injected onto the heating element in order to create the desired conditions.

The methods and systems of the present disclosure, as described above and shown in the drawings, provide for a water injection system having improved water pressure control. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An oven having water injection system comprising:
an oven comprising:
a compartment enclosed on all sides;
a water injector;
a first water valve coupled to the water injector, wherein the water valve includes proportional control; and
a heated bottom of the oven, wherein condensed water is collected at the heated bottom of the oven, wherein the heated bottom of the oven is configured and adapted to heat the condensed water such that the water evaporates and returns to the oven to continue to heat food, and wherein water is recycled back to a reservoir once the food is heated.

2. The water injection system of claim 1, further comprising a proportional-integral-derivative controller (PID) controller.

3. The water injection system of claim 1, further comprising a pulse width modulator controller.

4. The water injection system of claim 1, further comprising an analogue system controller.

5. The water injection system of claim 1, further comprising a second water valve coupled to the first water valve.

6. The water injection system of claim 5, wherein the second water valve is an on/off valve configured to act as a safety mechanism.

7. The water injection system of claim 1, further comprising an overpressure valve for condensing the steam and returning water to a galley.

8. The water injection system of claim 7, further comprising a controller that maintains a predefined pressure by manipulating energy provided to the heating elements.

9. The water injection system of claim 1, wherein the system the oven is connected to an aircraft galley.

10. A method of operating an aircraft oven comprising:
providing water to a reservoir disposed outside of a compartment of the oven;
partially opening a water valve, wherein the water valve is opened to a point between fully open and fully closed;
injecting water from the reservoir into the compartment through the water valve onto a water heater;
producing steam on the water heater in order to cook a food;
collecting condensed water at the bottom of the oven;
heating the collected water.

11. The method of claim 10, wherein the water valve is opened to release water.

12. The method of claim 10, wherein the heater is heated by aircraft power.

13. The method of claim 10, further comprising opening an on/off valve to allow water to reach the water valve.

14. The method of claim 10, further comprising heating the collected water to a steam temperature.

15. The method of claim 10, further comprising collecting a portion of the condensed water and returning the portion to the reservoir.

16. The method of claim 15, wherein the water is returned to the reservoir using an on/off valve.

* * * * *